United States Patent

[11] 3,556,239

| [72] | Inventor | Joseph W. Spahn<br>5007 N. Kensington, Kansas City, Mo.<br>64119 |
|---|---|---|
| [21] | Appl. No. | 761,560 |
| [22] | Filed | Sept. 23, 1968 |
| [45] | Patented | Jan. 19, 1971 |

[54] ELECTRICALLY DRIVEN VEHICLE
4 Claims, 5 Drawing Figs.

[52] U.S. Cl. .................................................. 180/68,
290/4, 290/9, 290/44, 290/55
[51] Int. Cl. ...................................................... B60l 11/14,
B60d 9/00
[50] Field of Search............................................ 120/65;
290/4, 9, 19, 22, 55, 54, 44, 43; 105/63; 180/7, 60

[56]        References Cited
         UNITED STATES PATENTS
|   757,800 | 4/1904 | Williams......................... | 290/55 |
| 1,181,988 | 5/1916 | Breitung........................ | 290/44X |
| 1,402,250 | 1/1922 | Pieper........................... | 180/65A UX |
| 3,211,249 | 10/1965 | Papst............................ | 180/65(A) |
| 3,374,849 | 3/1968 | Redman........................ | 180/65 |
| 3,444,946 | 5/1969 | Waterbury.................... | 180/65 |

FOREIGN PATENTS
| 12,129 | 0/1912 | Great Britain................ | 180/7P |

Primary Examiner—Benjamin Hersh
Assistant Examiner—Milton L. Smith
Attorney—Fishburn, Gold and Litman ABSTRACT: A battery powered automobile includes an air operated turbine fed by front and side air scoops for providing both charging current to the batteries and driving power for the automobile. An auxiliary internal combustion engine is included for use when necessary. Deceleration and wind sensitive controls operate door structure on the front air scoop so that it opens, increasing drag, only under predetermined conditions. Braking energy is utilized to help charge the batteries.

PATENTED JAN 19 1971

INVENTOR.
JOSEPH W. SPAHN

BY
Fishburn, Gold & Litman
ATTORNEYS

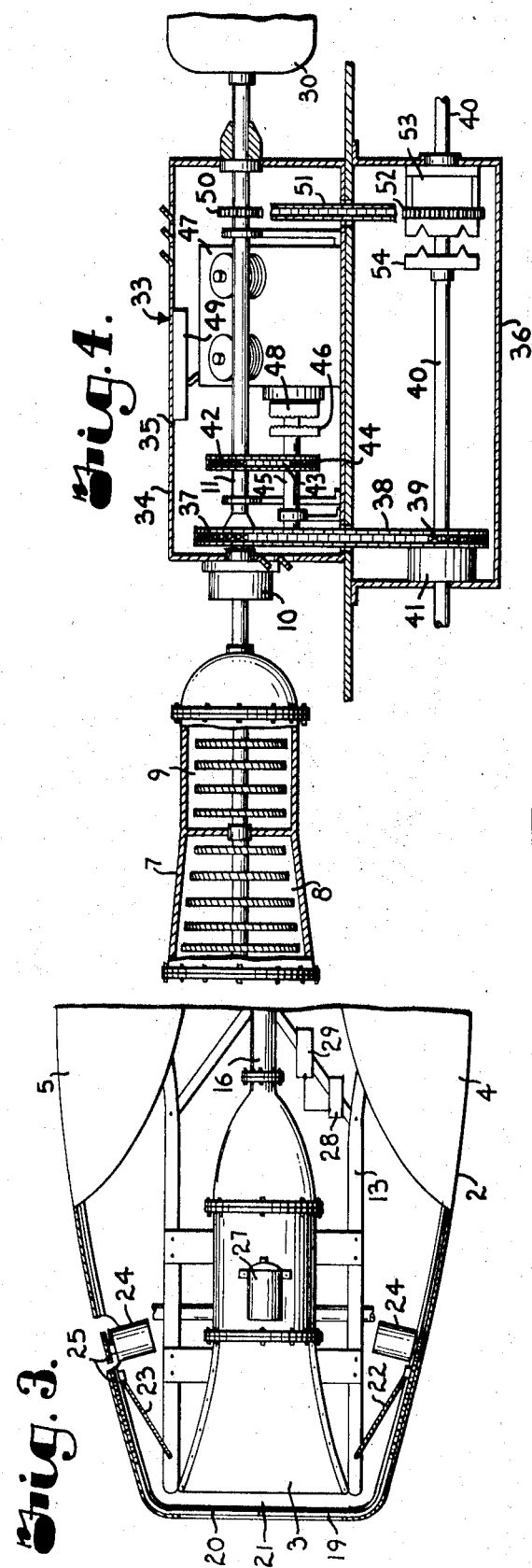
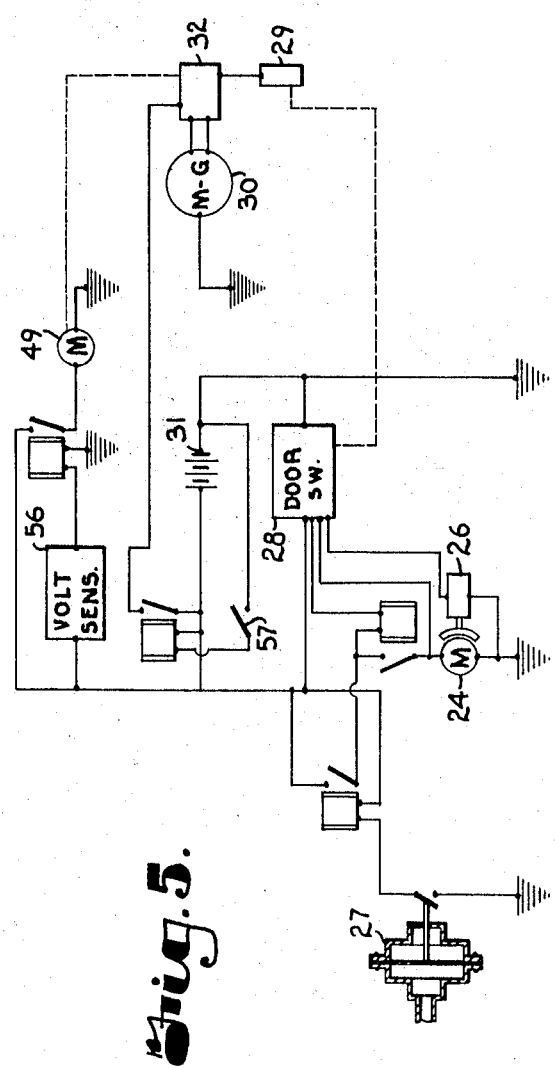

3,556,239

ELECTRICALLY DRIVEN VEHICLE

This invention relates to propulsion systems for a vehicle and more particularly to improvements in a battery driven automobile.

A vehicle constructed in accordance with this invention includes a source of portable electrical energy, such as batteries, feeding an electric motor connected through a suitable drive train to the wheels and of the type adapted to function as a generator when driven. An air turbine is mounted on the vehicle and receives relatively moving air for the purpose of recharging the battery. Thus, both braking energy and the energy of moving air are used for recharging the battery. An auxiliary internal combustion engine is provided to insure propulsion when sufficient electrical energy is not available.

The principal objects of the present invention are: to provide an electrically driven vehicle which utilizes multiple sources of energy for recharging batteries; to provide such a vehicle wherein energy is tapped to recharge the batteries only where such action will not interfere with desired propulsion of the vehicle; to provide such an arrangement wherein wind energy for recharging batteries is obtained both from forwardly directed and laterally directed scoops so that crosswind energy as well as normal air flow may be utilized; and to provide such an arrangement wherein braking energy is used for creating charging current and an auxiliary power source in the form of an internal combustion engine is included for use when necessary.

Other objects and advantages of this invention will become apparent from the following description taken in connection with the accompanying drawings wherein are set forth by way of illustration and example certain embodiments of this invention.

FIG. 3 is a fragmentary plan view similar to FIG. 2 but showing front air scoop doors in closed position.

FIG. 4 is a fragmentary cross-sectional side elevation on a larger scale showing the power train of the automobile.

FIG. 5 is a schematic wiring diagram of the vehicle electrical components.

Figure 1:
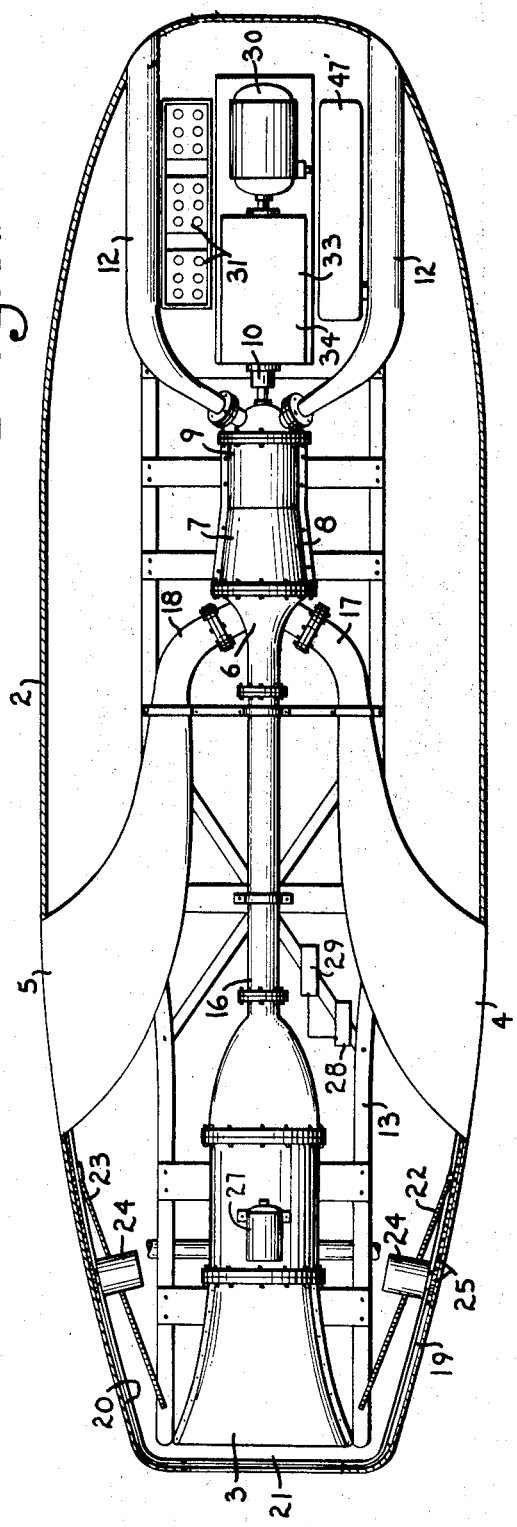
FIG. 1 is a partially schematic side elevation of an automobile embodying this invention with portions broken away to show interior construction.
Figure 2:
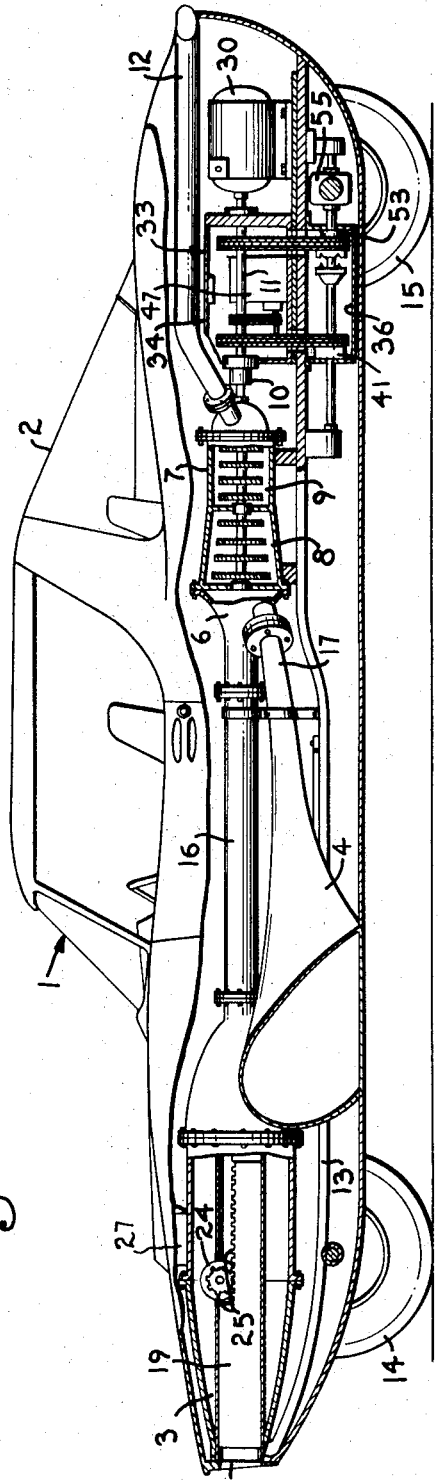
FIG. 2 is a partially schematic cross-sectional plan view showing interior construction of the automobile.

Referring more in detail to the drawings:

The reference numeral 1 generally indicates an automobile constructed in accordance with this invention. The automobile 1 comprises a streamline body 2 designed for minimum resistance to movement through the atmosphere and having a front opening air scoop 3 and lateral air scoops 4 and 5 opening at the respective sides of the structure. The air scoops 3, 4, and 5 respectively communicate into a manifold 6 forming the mouth or input of an air turbine 7 of the type having a free wheeling, low pressure forward section 8, which compresses the air therein while directing it rearwardly into a higher pressure section 9 fixed on a common shaft with an overrunning clutch 10. The clutch 10 is drivingly engaged with a rearwardly directed shaft 11 when the rotational speed of the turbine section 9 tends to exceed that of the shaft 11.

The air in the higher pressure section 9, after being utilized, exhausts through rearwardly opening exhaust pipes 12 which are aided in evacuation when air flows over the body 2 due to the rear position thereon.

The body 2 is supported on a suitable frame 13 to which are rotatably journaled front wheels 14 and rear wheels 15 in the usual manner through conventional suspension structure (not shown). The scoops 3, 4, and 5, the ducts 16, 17, and 18 connecting the scoops to the manifold 6, and the turbine 7 are suitably mounted on the frame 13 along with the remaining propulsion structure described below.

Sliding flexible panels or doors 19 and 20 are engaged in suitable guides for meeting in the center of the mouth 21 of the scoop 3 to block entrance thereto. Elongated tension springs 22 and 23 urge the doors 19 and 20 to closed position and motors 24 operating, in this example, through suitable rack and pinion sets 25 are adapted to selectively urge the doors open under predetermined conditions. The doors 19 and 20 are maintained in open position against the tension of the springs 22 and 23 by brakes 26 (FIG. 5) controlled by electrically operated means described below.

An air pressure or speed switch 27 is located on the body 2 in a position to sense the flow of air past the automobile and is operable to prevent the doors 19 and 20 from opening below a predetermined air speed. Functioning in conjunction with the switch 27 is a deceleration switch 28. The deceleration switch 28 is operable to actuate the motors 24 to open the doors 19 and 20 (assuming that sufficient air speed is sensed by the air pressure switch 27) when driving power is no longer applied to the automobile, as when the driver intends to slow his forward speed. The deceleration switch 28, for example, may be operated through suitable linkage with the automobile accelerator pedal 29. Through the functioning of the switches 27 and 28, the doors 19 and 20 are open only when there is sufficient air speed to efficiently operate the turbine 7 and the automobile does not require driving power. The closing of the doors 19 and 20 substantially streamlines the vehicle for minimum air resistance.

The lateral scoops 4 and 5, however, are always open to take advantage of any crosswinds which generally do not hinder the forward motion of the automobile.

Also mounted on the frame 13 is a motor 30 of the type which, when electrically energized, acts as a motor, but when driven, functions as a generator. A suitable bank of batteries 31 are carried on the frame 13 and electrically communicate with the motor 30 through a suitable conventional control 32 by which the desired torque and speed output of the motor is obtained when desired and current is directed into the batteries 31 when the motor is driven. The motor 30 is connected to the shaft 11 which forms part of a drive assembly 33 also mounted on the frame 13.

The drive assembly 33 comprises a housing 34 and, in this example, has an upper section 35 and a lower section 36. The upper section 35 contains a sprocket 37 fixed to the shaft 11 and mating with a chain 38 which in turn engages a sprocket 39 contained in the lower section 36 on a shaft 40. The sprocket 39 is rotatable with respect to the shaft 40 but forms the input to a fluid coupling 41, the output of which is fixed to the shaft 40. Thus, the rotation of the shaft 11 causes the rotation of the sprocket 39, but the latter rotation is not transferred to the shaft 40 until the torque output of the fluid coupling 41 overcomes the resistance of the shaft 40.

Also mounted on the shaft 11 is a sprocket 42 engaged with a chain 43 which, in turn, engages a sprocket 44 fixed to a shaft 45 which supports a clutch plate 46. An internal combustion engine 47 of suitable design is schematically shown within the housing section 35 and has the output thereof in the form of a clutch plate 48 adapted to be driven into engagement with the plate 46 through operation of an electrically actuated hydraulic actuator 49 noted below. A tank 47' for containing fuel is mounted on the frame 13 and connected to the engine 47.

An additional sprocket 50 is fixed to the shaft 11 and engages a chain 51 which engages a sprocket 52 mounted on a floating clutch 53 mounted on, but rotatable with respect to, the lower shaft 40. A clutch plate 54 is fixed to the shaft 40 and is adapted to be engaged by the floating clutch 53 when brake of the automobile is actuated in the usual manner. It is noted that the automobile brake also involves the usual wheel braking system (not shown). The shaft 40 projects rearwardly of the housing lower section 36 into a suitable gear box and differential system 55 wherein the desired drive ratios with the rear wheels 15 are obtained.

In operation, the automobile, through the control 32, is normally powered by the motor 30 receiving current from the batteries 31. If wind conditions are proper whereby the turbine 7, through the lateral scoops 4 and 5, produces an output speed at the clutch 10 which is greater than the rotational speed of the shaft 11, the clutch 10 engages and the turbine 7 helps drive the automobile. During deceleration, the front scoop 3 is opened and the additional turbine intake helps drive the motor 30 for recharging the batteries. When electrical energy is required to drive the automobile but the batteries are discharged below a predetermined level, this condition is sensed by a suitable voltmeterlike device 56 which, through a relay operates the actuator 49 which starts the internal combustion engine 47 and engages the clutch plates 46 and 48. The accelerator pedal 29 of the automobile is then operable to control the internal combustion engine 47 which continues to drive the automobile until the batteries are charged to a suitable energy level whereupon the device 56 causes deactuation of the engine and disengagement of the clutch plates 46 and 48.

When the automobile is decelerated, as by braking, the normal braking system of the car actuates the floating clutch 53 to engage the clutch plate 54 whereupon the rear wheels drive the shaft 40 which, in turn, drives the shaft 11 through the chain 51 but at a substantially higher ratio than usual, whereupon the energy of deceleration is utilized by the motor 30 to charge the batteries. If the braking force obtained through rotation of the motor 30 is insufficient, further depression of the brake pedal will operate conventional automobile brakes (not shown). Ignition switch 57 is provided for the usual purpose.

Although one form of this form of this invention has been illustrated and described, it is not to be limited thereto except insofar as such limitations are included in the following claims.

I claim:

1. An electrically driven vehicle comprising:
    a. a mobile frame having wheels mounted thereon for rolling movement along the ground;
    b. an electric motor on said frame and operably connected to said wheels for driving said vehicle;
    c. a storage battery on said frame and connected to said motor for driving said motor;
    d. an air powered turbine on said frame, an air scoop on said frame and connected with said turbine for driving said motor, means selectively mechanically connecting said air turbine to said motor;
    e. an auxiliary internal combustion engine mounted on said frame;
    f. voltage sensing means associated with said battery and operably connected between said engine and said wheels; and
    g. said last named means being operable to start said engine and connect said engine to said wheels when said battery is discharged to a predetermined condition.

2. An electrically driven vehicle comprising:
    a. a mobile frame having wheels mounted thereon for rolling movement along the ground;
    b. an electric motor on said frame and operably connected to said wheels for driving said vehicle;
    c. a storage battery on said frame and connected to said motor for driving said motor;
    d. an air powered turbine on said frame, an air scoop on said frame and communicating with said turbine for driving said motor, means selectively mechanically connecting said air turbine to said motor;
    e. said air scoop being forwardly directed, and including; and
    f. doors adapted to block said air scoop to reduce air resistance when said motor is driving said vehicle, said doors including air speed sensing means adapted to maintain said doors closed below a predetermined air speed.

3. An electrically driven vehicle comprising:
    a. a mobile frame having wheels mounted thereon for rolling movement along the ground;
    b. an electric motor on said frame and operably connected to said wheels for driving said vehicle;
    c. a storage battery on said frame and connected to said motor for driving said motor;
    d. an air powered turbine on said frame, an air scoop on said frame and communicating with said turbine for driving said motor, means selectively mechanically connecting said air turbine to said motor;
    e. said air scoop being forwardly directed, and including;
    f. doors adapted to block said air scoop to reduce air resistance when said motor is driving said vehicle; and
    g. said doors including means sensitive to the reduction of driving energy to said vehicle to operate said doors.

4. The vehicle as set forth in claim 3 wherein said air scoop comprises:
    a. laterally directed air scoops adapted to receive crosswind energy for powering said turbine.